United States Patent [19]

Daiglo et al.

[11] Patent Number: 4,911,387
[45] Date of Patent: Mar. 27, 1990

[54] MODULAR CONDUIT SYSTEM

[75] Inventors: Robert Daiglo, Deerfield Beach, Fla.; Gordon J. Grice, Janesville, Wis.

[73] Assignee: Creative Systems Engineering, Inc., Janesville, Wis.

[21] Appl. No.: 354,806

[22] Filed: May 22, 1989

Related U.S. Application Data

[63] Continuation-in-part of Ser. No. 211,967, Jun. 27, 1988.

[51] Int. Cl.⁴ ................................................. F16L 3/00
[52] U.S. Cl. ......................................... 248/62; 248/65; 248/74.4
[58] Field of Search ...................... 248/62, 74.1, 74.2, 248/74.4, 74.5, 65, 73, 49, 58, 63, 343; 239/209; 138/107

[56] References Cited

U.S. PATENT DOCUMENTS

| | | | |
|---|---|---|---|
| 2,625,354 | 1/1953 | Smith | 248/58 |
| 4,079,786 | 3/1978 | Moling | 239/209 X |
| 4,252,289 | 2/1981 | Herb | 248/62 |
| 4,446,818 | 5/1984 | Rieterink | 248/343 X |
| 4,653,716 | 3/1987 | Sakaguchi | 248/74.5 X |

FOREIGN PATENT DOCUMENTS

| | | | |
|---|---|---|---|
| 1272412 | 7/1968 | Fed. Rep. of Germany | 248/74.2 |
| 0835605 | 5/1960 | United Kingdom | 248/74.4 |

*Primary Examiner*—Ramon O. Ramirez
*Attorney, Agent, or Firm*—M. K. Silverman

[57] ABSTRACT

A modular conduit securement system including a back bracket having, in transverse cross-section, a plurality of polygonal back surfaces porportioned for securement to at least one constructional surface, the bracket having a front surface including resilient nesting elements having a partially opened face geometry. The back bracket further includes, along each opposing inner transverse edge thereof, first complemental coupling elements. A conduit, proportioned for complemental coupling to the nesting elements of the back bracket, is provided. Further provided is an inner front plate proportioned, in transverse to cross-section, for complemental engagement with the first complemental coupling elements to thereby provide a modular conduit system formed by the insertion of the conduit into the nesting elements and by the coupling of the front plate over the first coupling elements of the back bracket. The system may also include second complemental coupling elements provided along opposite outer transverse edges of the back bracket, with an outer front plate proportioned for complemental engagement with the second complemental coupling elements to provide both a cover to the conduit and a region within which insulative or other protective material may be held.

14 Claims, 4 Drawing Sheets

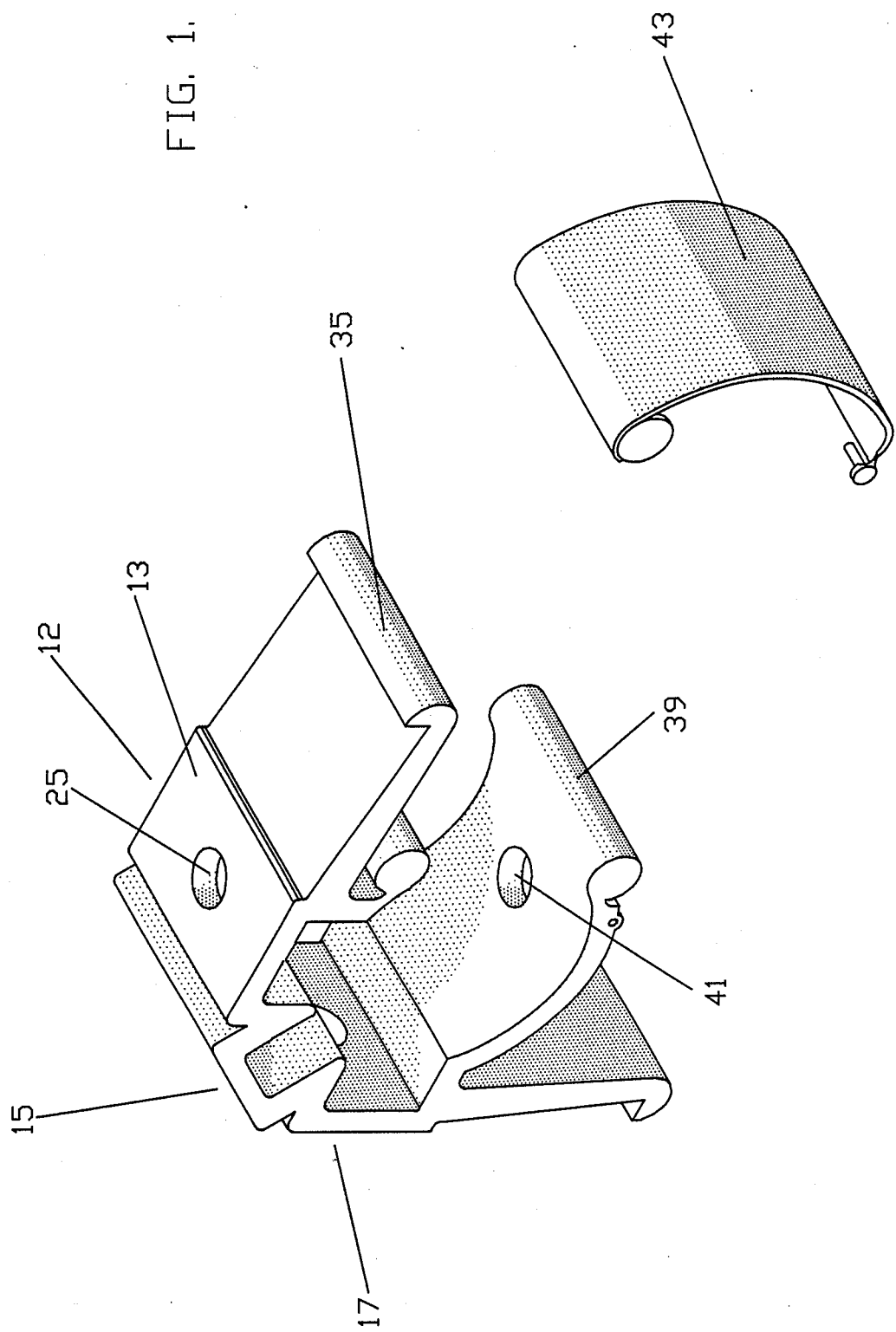

MODULAR CONDUIT SYSTEM

REFERENCE TO RELATED APPLICATION

This case is a continuation-in-part of application Ser. No. 211,967, filed June 27, 1988, entitled Modular Waterpipe System.

BACKGROUND OF THE INVENTION

The present invention relates to a modular conduit system and, more particularly, to a conduit system which will facilitate ease of securement of water piping and electrical conduits to walls, ceilings and the like, and which, as well, will provide a method of insulation of such piping and conduits. A bracket having a particular configuration facilitates the novel modular conduit system.

There exists, in the prior art, various types of brackets having utility in the securement of one or another type of conduit. Such art, as is best known to the inventor, is reflected in U.S. Pat. No. 2,625,354 (1953) to Smith, entitled Pipe Supporting and Anchoring Means; U.S. Pat. No. 3,295,805 (1967) to Modeme, entitled Two part Clip for Attaching a Cylindrical Member to a Support; U.S. Pat. No. 4,079,786 (1978) to Moling, entitled Fire Extinguishing System; and U.S. Pat. No. 4,252,289(1981) to Herb, entitled Two Part Pipe Clip. Relevant foreign prior art known to the Applicant consists of Swiss Patent No. 306,165 (1955) to Picart, entitled Bracket for the Fixation of Cables.

None of the above, nor other prior art known to the Inventor, discloses a modular conduit system in which the conduit may be nested within a bracket structure for the selective decoupling therefrom and which, further, provides for the selective inclusion of insulation about the conduit shield within a self-contained modular protective heat shield as an exterior plate. Prior art modular conduit systems do not enjoy the structural integrity, or the option of employing insulation, or the ease of installation, as is provided by the structure and system herein. Accordingly, components and systems that exist in the prior art are not practically functional as a heat shield as is the case in the system set forth herein.

The instant invention is formed completely of components which may be selectably coupled, as by snap fitting, together to form common connections between all components thereof, thereby alleviating the need for much of the laborious aspects associated with installation of conduits and piping as has been known in the prior art.

It is in response to the above described limitations in the prior art, that the present invention is directed.

SUMMARY OF THE INVENTION

The present invention constitutes a modular system for the securement of a conduit to at least one transverse constructional surface. The system includes a back bracket having, in transverse cross-section, a partial polygonal back surface in which each face thereof is proportioned for securement to at least one constructional surface, the bracket also having a front surface comprising resilient nesting means having a partially open-faced geometry, said back bracket further comprising, along each opposing inner transverse edge thereof, first complemental coupling means. The system also includes a conduit proportioned for complemental coupling with said nesting means of said back bracket. The system further includes an inner front plate proportioned, in transverse cross-section, for complemental engagement with said first complemental coupling means. In the resultant system, a modular conduit system is formed by inserting said conduit within the nesting means and by coupling said inner front plate to said first coupling means of said back plate. Through the use of a second complemental coupling means, an outer front plate is coupled over said inner plate, acting as a heat and decorative shield.

In view of the above, it may be appreciated that an object of the instant invention is to provide an improved modular conduit system by which an installation of a water pipe or electrical conduit, and heat shields therefore, to walls, ceilings, and/or intersections thereof, of a building may be more readily facilitated.

It is another object to provide a modular conduit system of the above type in which insulation of the conduit may be provided internally to the cross sectional geometry of such a system.

It is a further object of the present invention to provide an electrical conduit and/or water pipe system in which a protective heat shield may be pressed-fittably coupled over the pipe and about the insulation thereof.

The above and yet other objects and advantages of the present invention will become apparent from the hereinafter set forth Detailed Description of the Invention, The Drawings, and Claims appended herewith.

BRIEF DESCRIPTION OF THE DRAWINGS

FIG. 1 is a perspective exploded view of the back bracket and inner front plate of the modular system.

DETAILED DESCRIPTION OF THE INVENTION

Figure 2:
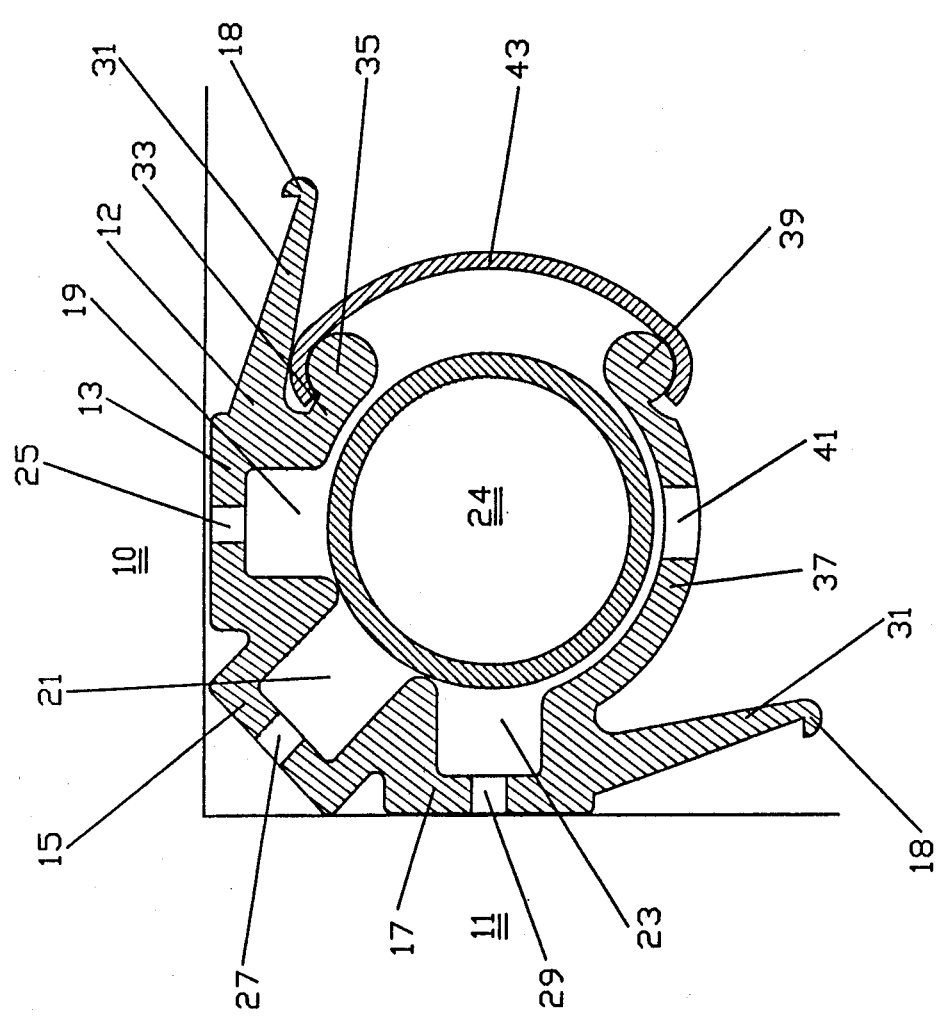
FIG. 2 is a transverse, radial view of the modular system showing the conduit and inner front place in position and the back bracket secured at the corner of a room, to a wall and ceiling thereof.

With reference to the views of FIGS. 1 and 2, the modular conduit system is seen to include a back bracket 12 having a plurality of polygonal rear surfaces 13, 15 and 17. In the view of FIG. 2, said surface 13 is secured to ceiling 10 through the use of screw means (not shown) which may be inserted through channel 25, while said surface 15 is secured to wall 11 through the use of screw means which may be inserted through opening 29. As may be noted, each of said surface may be secured through opening 29. As may be noted, each of said surfaces 13, 15 and 17 are proportioned for securement to at least one constructional surface. For example, in the view of FIG. 3, said surface 15 is shown secured to a single constructional surface. Accordingly, it is to be appreciated that the use of such a plurality of polygonal rear surfaces of back bracket 13 provides the user with an option of utilizing the same bracket for any one of a number of potential constructional situation requiring the support or securement of a conduit or pipe.

On the outer side of the said back bracket 12 are provided a plurality of inner radial recesses 99, 21 and 23 which correspond to said polygonal faces 13, 15 and 17 respectively. One of the important functions of such recesses is to provide radial flexibility to the back bracket to assist in the below described coupling functions. With reference to FIG. 2, it is noted that said back plate 12 further includes a pair of first complemental coupling means 35 and 39 which are disposed along opposite inner transverse edges of the back plate. More particularly, an upper first complemental coupling means 35 depends from area 33 of the back plate, while a lower first complemental means 39 depends from arm 37 of the back plate. Arm 37 is provided with a hole 41, the function of which is more fully described below.

Figure 3:
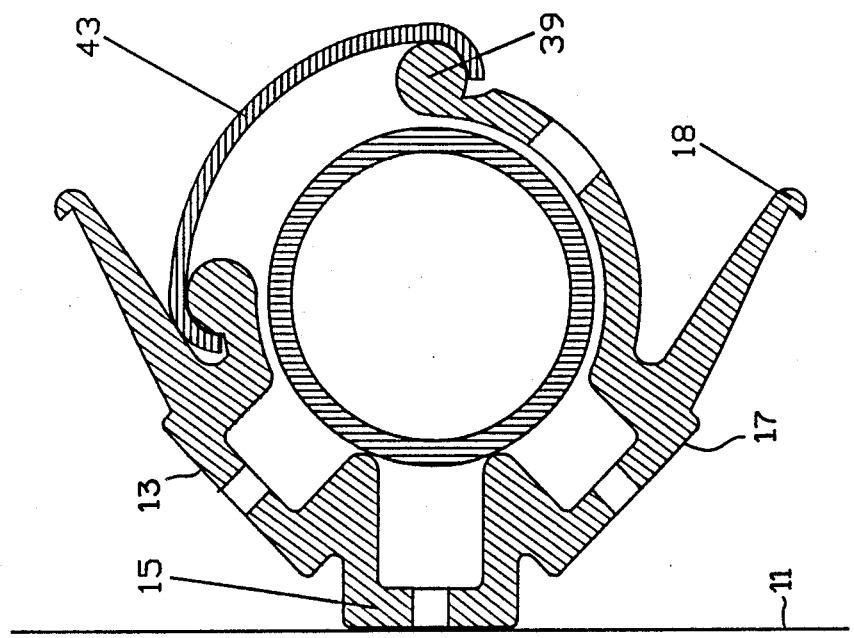
FIG. 3 is a transverse radial view, similar to the view of FIG. 2, however showing the back bracket of the system secured only against a wall and making use of a different polygonal surface of the back bracket than the polygonal surface employed in the view of FIG. 2.

Further shown in the views of FIGS. 2 and 3 is a conduit 24 which is proportioned for complemental coupling within the nesting means of the back plate which means are defined by said area 33, its depending first complemental coupling means 35, arm 37, and its depending first complemental coupling means 39. Accordingly, with reference to the illustration of FIGS. 2 and 3, it may be appreciated that conduit 24 may be snapped fillably, i.e., complementally coupled within back bracket 12 by pressing conduit 24 through first complemental coupling means 35 and 39 so that it will abut against outer edges of said inner recesses 19, 21 and 23. Aperture 41 may be used if a need exists to exert further pressure against the conduit 24.

It would be further noticed that surfaces 13 and 17 form a 45 degree angle relatively to wall 11 in the embodiment of FIG. 3.

The instant inventive modular conduit system also includes a snap-on inner front plate 43 which, in the transverse cross-section views of FIGS. 2 and 3, is proportioned for complemental engagement with said first complemental coupling means 35 and 39 of the back bracket 12. As may be noted in FIG. 3 front plate 43 may, optionally, be provided with a hinge connection to arm 37 to assist in the snap-fit connection between plate 43 and first coupling means 35 and 39. Accordingly, the result of the above described system is that of a modular conduit system formed by the insertion of a conduit into the nesting means of the back bracket and by the coupling of said inner front plate 43 to the first complemental coupling means of said back bracket.

The back bracket 12 further exhibits elongate radial elements 31 (see FIG. 2) from which depend second complemental coupling means 18, each of said second complemental coupling means disposed at opposite outer transverse edges at the back bracket.

Figure 4:
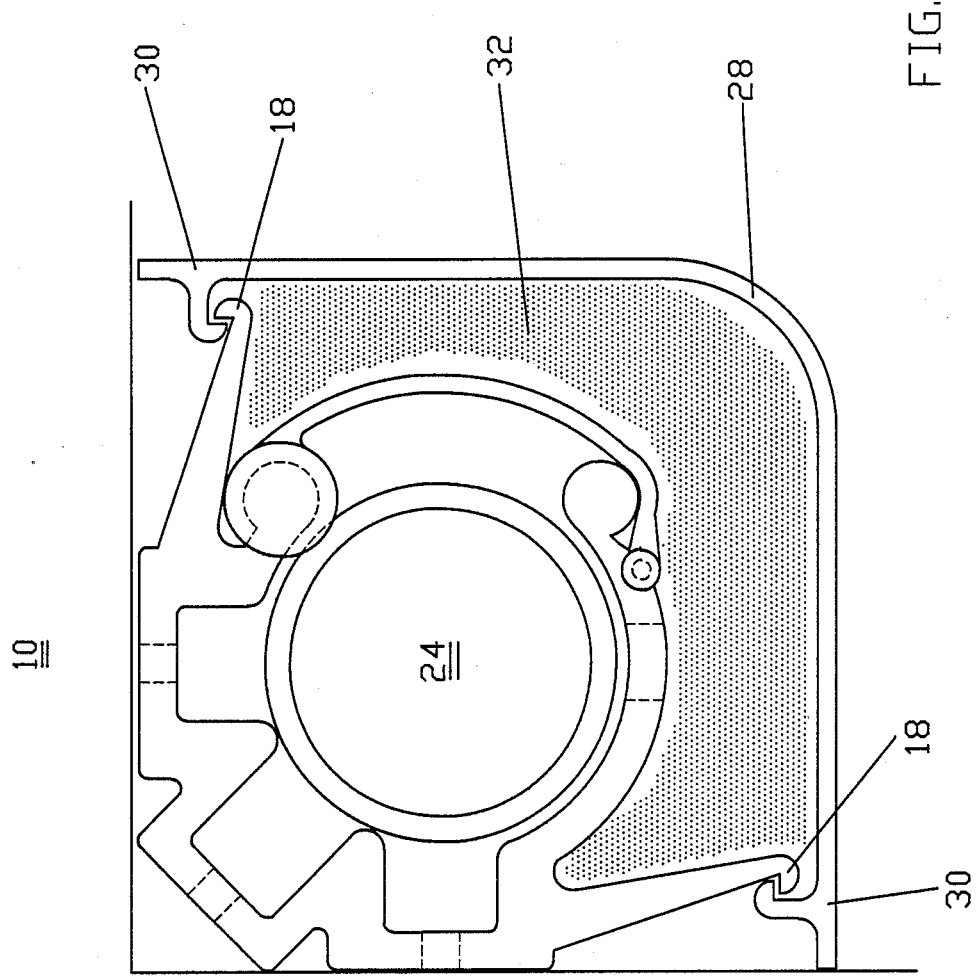
FIG. 4 is a transverse radial cross-sectional view similar to the view of FIG. 2, however showing use of the outer front plate of the system, and insulation associated therewith.

With reference to FIG. 4, it may be seen that said second complemental coupling means are proportioned for complemental engagement with an outer front plate 28 having complemental coupling means 30 which are complemental with said second complemental coupling means 18 of back bracket 12. In the volumetric region between outer front plate 28 and inner front plate 43, there may be provided insulation or fire retarding materials. Alternatively, other items such as sensors, monitors and the like may be selectably disposed within insulation area 32.

Figure 5:
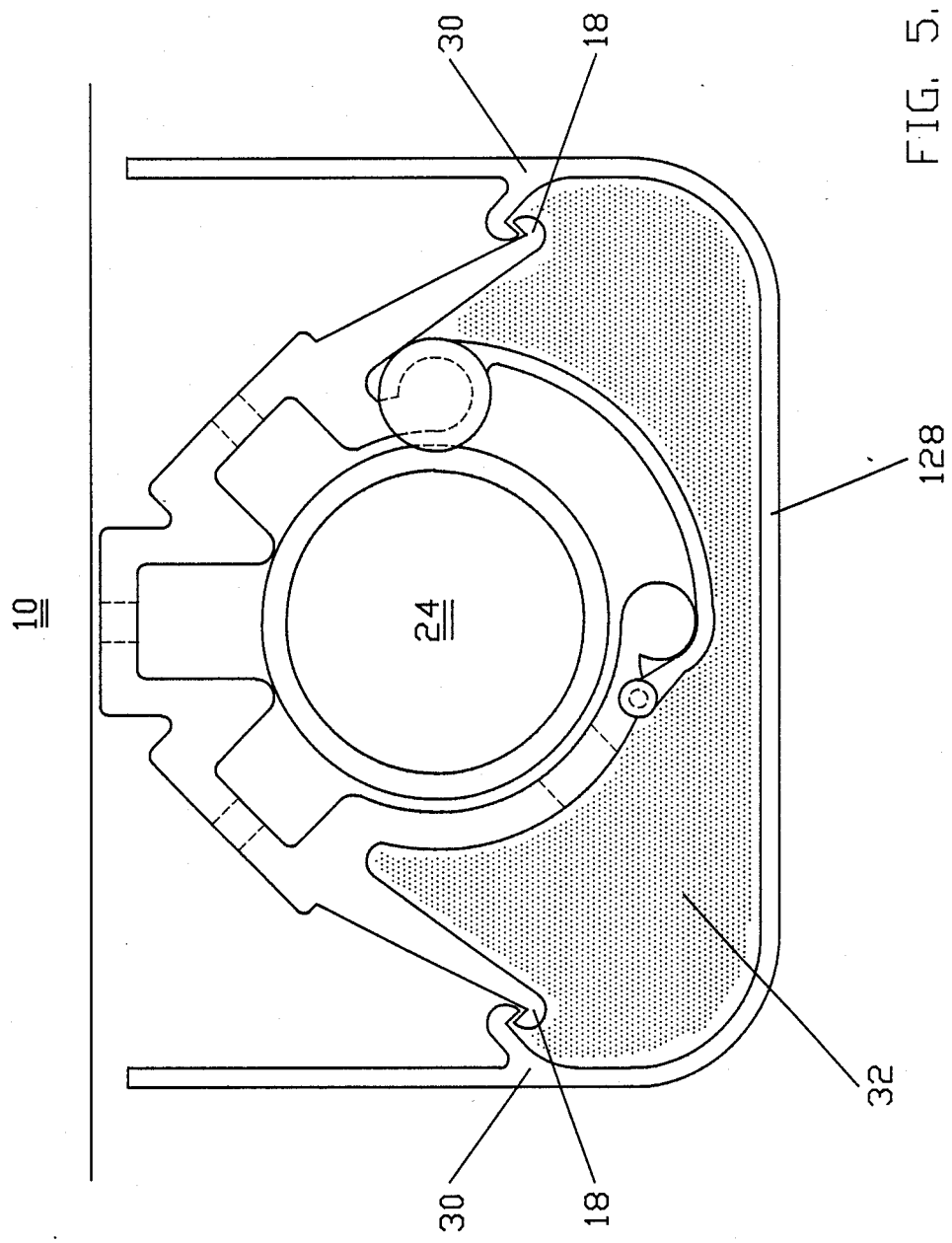
FIG. 5 is a transverse radial cross-sectional view, similar to the view of FIG. 4, however, showing the use of a different type of outer front plate.

In FIG. 5 there is shown a further embodiment of outer plate 128. This embodiment is of particular utility when the back bracket is suspended from the ceiling.

It is to be understood that a plurality of brackets and front plates having the cross-sectional geometry shown in the figures may be provided in order to form a modularized pipe or conduit system having any length which may be desired.

It is to be appreciated that when all components of the system have been complementally coupled to each other, the result is that of a common fit between all components thereof which, accordingly, alleviates need for much of the laborious aspects associated therewith the installation of conduits and piping as has been known in the prior art.

Accordingly, while there has been shown and described a preferred embodiment in the present invention, it is to be appreciated that the invention may be embodied otherwise than is herein specifically shown and described and that, within said embodiment, certain changes may be made within the detail and construction thereof without departing from the underlying idea or principles of the present invention within the scope of the claims appended herewith.

Having thus described my invention, what I claim as new, useful and non-obvious and accordingly, secure by Letters Patent of The United States is:

1. A modular system for the securement of a conduit to at least one constructional surface, the system comprising:
   (a) a back bracket having, in transverse cross-section, a partial polygonal back surface having a plurality of faces, each face thereof proportioned for securement to at least one constructional surface, said bracket having front surfaces, defining resilient nesting means having a partially open-faced geometry, said back plate further comprising, along each opposite inner transverse edge thereof, first complemental coupling means; and
   (b) a conduit proportioned for complemental coupling to said nesting means of said back plate.

2. The system as recited in claim 1, further comprising:
   an inner front plate proportioned, in transverse cross-section, for complemental engagement with said first complemental coupling means,
   whereby a modular conduit system may be formed by inserting said conduit within said nesting means and by coupling said inner front plate to said first coupling means of said back bracket.

3. The system as recited in claim 1, in which said back bracket further comprises:
   second complemental coupling means along each opposite outer transverse edge thereof.

4. The system as recited in claim 2, in which said back bracket further comprises:
   second complemental coupling means along each opposite transverse end thereof.

5. The system as recited in claim 3, in which said system further comprises:
   an outer front plate proportioned, in transverse cross-section, for complemental engagement with said second complemental coupling means,
   whereby a modular pipe system having insulation or protective materials secured within said outer front plate and exterior to said conduit may be formed.

6. The system as recited in claim 4, in which said system further comprises:
   an outer front plate proportioned, in transverse cross-section, for complemental engagement with said second complemental coupling means, whereby a modular pipe system having insulation or protective material secured within said outer front plate and external to said conduit may be formed.

7. The system as recited in claim 2, in which said polygonal back surface of said back bracket comprises three surfaces, each oriented at about 45 degrees relative to surfaces adjacent thereto.

8. The system as recited in claim 6, in which said polygonal back surface of said back bracket comprises three surfaces, each oriented at about 45 degrees relative to surfaces adjacent thereto.

9. The system as recited in claim 5, in which each of said second complemental coupling means of said back bracket comprise:
   an elongate radial element projecting radially beyond its surface nearest the surface of said first complemental coupling means.

10. The system as recited in claim 8, in which each of said second coupling means of said back bracket, each comprise:
    an elongate radial element projecting radially beyond its surface nearest the surface of said first complemental coupling means.

11. The system as recited in claim 2, in which said nesting means of said back bracket includes one front radial recess corresponding to each one of said polygonal surfaces,
    whereby radial resilience is thereby afforded to said back bracket.

12. The system as recited in claim 4, in which said nesting means of said back bracket includes one front radial recess corresponding to each one of said polygonal surfaces,
    whereby radial resilience is thereby provided to back bracket.

13. The system as recited in claim 6, in which said nesting means of said back bracket includes one front radial recess corresponding to each one of said polygonal surface,
    whereby radial resilience is thereby afforded to said back bracket 14. The system as recited in claim 9, in which said nesting means of said back bracket includes one front radial recess corresponding to each one of said polygonal surfaces,
    whereby radial resilience is thereby afforded to said back bracket.

* * * * *